United States Patent

[11] 3,625,884

| [72] | Inventor | Owen R. Waltrip |
| | | Roseville, Calif. |
| [21] | Appl. No. | 856,284 |
| [22] | Filed | Sept. 9, 1969 |
| [45] | Patented | Dec. 7, 1971 |
| [73] | Assignee | Sonetics, Inc. |
| | | Continuation-in-part of application Ser. No. 679,484, Oct. 31, 1967, now Patent No. 3,480,529, dated Oct. 31, 1967. This application Sept. 9, 1969, Ser. No. 856,284 |

[54] SEWAGE TREATMENT PROCESS
22 Claims, 3 Drawing Figs.

[52] U.S. Cl. ..................................................... 210/19,
204/149, 210/152, 210/388
[51] Int. Cl. ..................................................... C02c 1/00
[50] Field of Search ........................................... 210/1, 3-9,
19, 152, 388; 204/149

[56] References Cited
UNITED STATES PATENTS

| 2,790,762 | 4/1957 | Heymann ..................... | 210/19 |
| 2,799,398 | 7/1957 | Heymann ..................... | 210/19 UX |
| 3,264,213 | 8/1966 | Pav et al. ..................... | 210/19 X |
| 3,489,679 | 1/1970 | Davidson et al. ............. | 210/19 |

*Primary Examiner*—Michael Rogers
*Attorneys*—Clarence A. O'Brien and Harvey B. Jacobson

ABSTRACT: Treatment of a polluted medium such as sewage by dissociation of organic compounds. By injecting audiofrequency energy and ionizing the sewage, the contaminants and pollutants are rendered harmless. The audiofrequencies are selected to deal with the organic matter or compounds and other dissolved or colloidally suspended components constituting the pollutants or contaminants of the sewage.

PATENTED DEC 7 1971 3,625,884

Owen R. Waltrip
INVENTOR.

BY *Clarence A. O'Brien*
and *Harvey B. Jacobson*
Attorneys

SEWAGE TREATMENT PROCESS

This application is a continuation-in-part of my prior copending application, Ser. No. 679,484, filed Oct. 31, 1967, now U.S. Pat No. 3,480,529.

More particularly, the present application relates to a process as well as apparatus for treating sewage.

The method and apparatus of the present invention is concerned with the selective dissociation of chemical compounds in a medium containing such compounds in solution or colloidal suspension. The theory underlying this dissociation phenomena involves utilization of audiofrequency energy in resonance with the elements and compounds to be dealt with including active and dormant bacteria as discussed in my prior copending application aforementioned. The present invention however is specifically addressed to the utilization of this phenomena to alter the chemical and biochemical makeup of sewage in order to render it harmless as a pollutant.

In accordance with the present invention, oscillating energy generated at different audiofrequencies is combined to dissociate or breakdown the organic compounds of certain waste materials such as sewage. The oscillating energy may be transmitted to the sewage being treated by either converting it into mechanical vibrations or modulating radiofrequency energy in order to radiate the oscillating energy into the sewage. So that the sewage will respond to this treatment, it is ionized within a treating chamber by applying a DC potential thereto.

Depending upon the particular type of material to be treated, and the components thereof which must be dissociated to effectively decontaminate the material, an appropriate selection of audiofrequencies is made so as to be in harmony with these components or in resonance with the atomic structure of the elements of which the components are formed. Thus, in combination with certain types of waste material in which organic matter such as active bacteria must be biologically altered in order to render it harmless, the audiofrequencies selected must deal with the dissociation of hydrogen and carbon in order to break up the organic compounds as well as to agglomerate solids released as a result of such chemical breakdown to prevent them form chemically recombining. Audiofrequencies of 256 c.p.s. and 426⅔ c.p.s. have been found suitable for this purpose producing a resultant frequency of 341⅓ c.p.s. that must be amplified to a power level sufficient to effect the dissociation. To be effective however, these audiofrequencies must be complemented by oscillating energy at a common carrier frequency of 469⅓ c.p.s. having a beat frequency relationship to the other audiofrequencies of 256 c.p.s. While the audiofrequencies are responsible for breakdown of organic matter, radiofrequency energy when utilized is also responsible for breakdown of other components of the material being treated as pointed out in my prior copending application.

From actual tests, it has been found that filtered sewage treated in accordance with the present invention reveals an unexpected increase in suspended solids and dissolved oxygen. Apparently, the breakdown of organic compounds results in the increase in suspended solids and dissolved oxygen and accounts for a significant reduction in biochemical oxygen demand (BOD) as compared to sewage treated by prior art methods.

These together with other objects and advantages which will become subsequently apparent reside in the detail of the method of the present invention and apparatus thereof as more fully hereinafter described and claimed, reference being had to the accompanying drawings forming a part hereof, wherein like numerals refer to like parts throughout, and in which:

Figure 1:
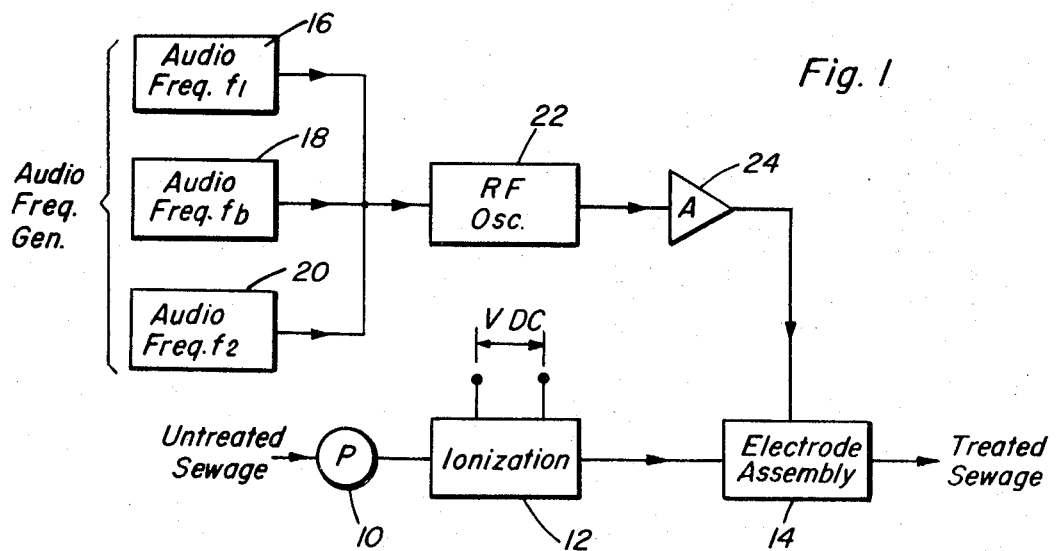
FIG. 1 is a schematic diagram illustrating one embodiment of apparatus by means of which the present invention may be practiced.

Referring now to the drawings in detail, FIG. 1 illustrates a preferred embodiment of the invention in which one type of sewage may be continuously treated by being fed by a suitable pump 10 into a treating chamber within which it is initially ionized by component 12 and then subjected to audiofrequency energy through an electrode assembly 14. Although a continuous process is diagrammatically illustrated, it will of course be appreciated that a batch method may be utilized as well.

The oscillating energy supplied to the electrode assembly 14 is derived in one embodiment of the invention from a plurality of audiofrequency generators including the generators 16, 18 and 20. The output of the generator 16 at a frequency $f1$ and the output of generator 20 at a frequency $f2$ are combined to produce a resultant frequency $fR=f1+f2/2$. This resultant frequency output of the audio generators modulates the radiofrequency output of oscillator 22. The modulated output signal of the oscillator 22 is amplified by amplifier 24 to a desired energy level so that it may be radiated by the electrode assembly 14 to the sewage passing through an activated zone. The audiofrequency outputs of the generators 16 and 20 are furthermore superimposed on the audiofrequency output of generator 18 of frequency of $f_b$ to produce a combined beat frequency of 256 c.p.s. necessary in accordance with the present invention to effect dissociation. Thus, the beat frequency relationship between the outputs of the generators may be expressed as: $2f_b \pm (f1+f2)=256$ In one specific example, the operating characteristics of the apparatus illustrated in FIG. 1 includes an audiofrequency $f1$ of 256 c.p.s. and an audiofrequency $f2$ of 426⅔ c.p.s. to produce a resultant frequency of 341⅓ c.p.s. modulating the carrier signal of the oscillator 22. The audiofrequency $f_b$ of generator 18 was accordingly set at 469⅓ c.p.s. Also the power range of amplifier 24 was between 20 and 500 watts. The output signal level of the amplified output of amplifier component 24 was empirically selected in order to produce maximum dissociation and varied from an optimum value depending on the sewage composition being treated during any unit of time to compensate for variations in atmospheric pressure under which the sewage was being treated. Also, a DC voltage was applied through plates of opposite polarity in order to ionize the sewage. In one actual embodiment the input power to the ionizing plates was set at a value of 25 watts per square inch of plate area.

Figure 2:
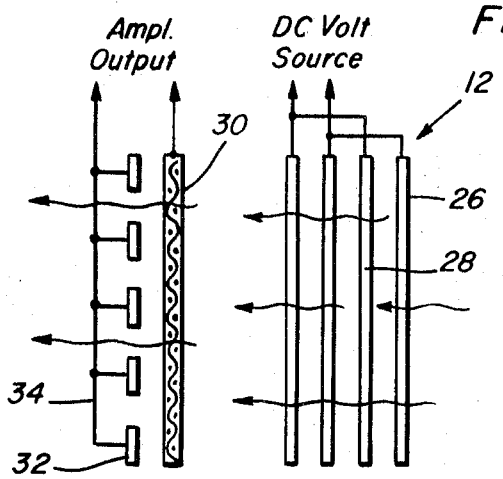
FIG. 2 is a simplified illustration of some of the apparatus details associated with the system of FIG. 1.

As shown in FIG. 2, the sewage is initially ionized by the ionizing assembly 12 which includes a plurality of plates 26 and 28 across which the DC voltage source is applied. Thus, the sewage is effectively found before the oscillating energy is applied thereto from the electrode assembly which includes a screen element 30 disposed in close spaced relation to a plurality of lead electrode elements 32 connected in parallel to a bus bar 34. The screen 30 which is made of stainless steel and the bus bar 34 are connected to the output of the amplifier 24.

Figure 3:
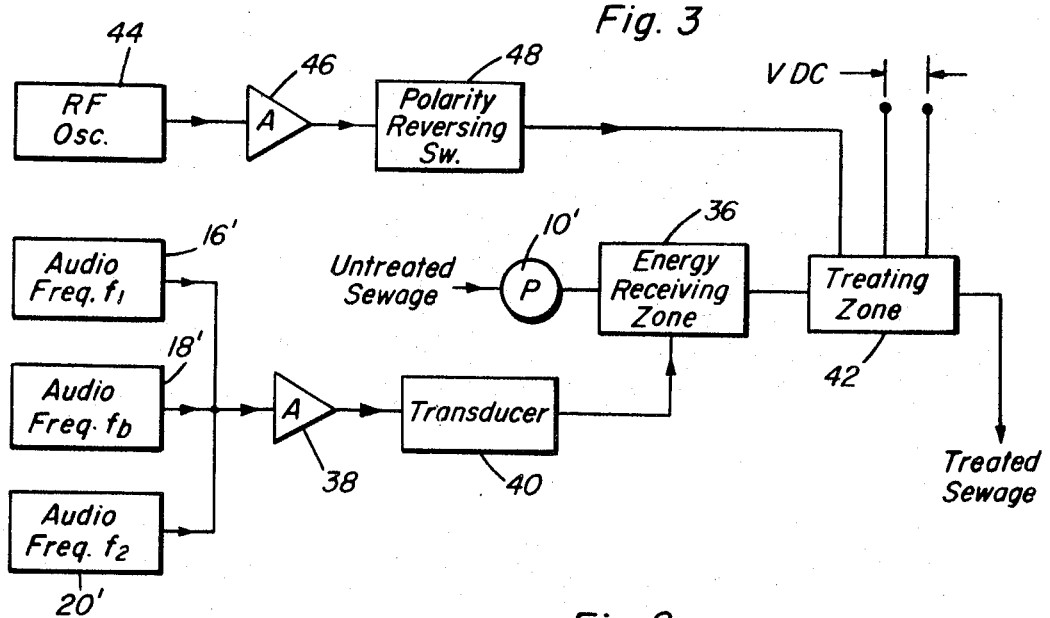
FIG. 3 is a diagrammatic illustrating of another form of apparatus or system for treating sewage similar to that disclosed in my prior copending application aforementioned.

The apparatus diagrammatically illustrated in FIG. 3 for practicing the present invention is similar to the apparatus shown in FIG. 7 of my prior copending application aforementioned. Thus, three audiofrequency generators 16', 18' and 20' are associated with the system illustrated in FIG. 3 from which the oscillating energy for treating the sewage, is desired. As in the case of FIG. 1, the sewage is continuously conducted by means of a pump 10' to an energy receiving zone 36. The audiofrequency generators 16', 18' and 20', the outputs of which are related to each other as described in connection with the generators in FIG. 1, are fed to an amplifier 38. The electrical output of the amplifier 38 is converted to a mechanical vibratory output by transducer 40 by means of which the oscillating energy is introduced to the sewage within the energy receiving zone 36. A DC voltage is also supplied to the treating zone 42 as diagrammatically shown in FIG. 3 for ionizing the sewage. In order to effectively transmit the oscillating energy to the sewage for dissociation purposes, radiofrequency energy is also transmitted to the treating zone 42 by means of a radiofrequency oscillator 44, the output of which is amplified by the radiofrequency amplifier 46. The amplified radiofrequency energy is however transmitted through a polarity reversing switch 48 as also described in my prior copending application in order to prevent deposits and accumulations on the electrodes that would in the absence of a reversal in polarity eventually halt the dissociation process. The reversal of polarity of course occurs at a relatively low rate of a few times per minute.

The apparatus associated with the system illustrated in FIG. 3 while the same as disclosed in my prior copending application is also basically similar to the apparatus and system illustrated in FIG. 1 except for the manner in which the audiofrequency energy is transmitted to the material being treated within the treating chamber. In the case of the system illustrated in FIG. 3, the oscillating energy of audiofrequency value was amplified to a proper energy level within a power range of 30 to 70 watts and converted from electrical into mechanical form so as to impart mechanical vibrations to the material being treated. Radiofrequency energy is simultaneously applied at the same time. In the system illustrated in FIG. 1, the oscillating energy from the audiofrequency generators modulates the output of a radiofrequency oscillator which is then amplified to the proper energy level and applied through an electrode assembly to the material being treated. Further, in accordance with the present invention an audiofrequency of 256 c.p.s. is selected for one of the audio generators in order to deal with the dissociation of carbon from hydrogen, the elements which form part of the organic compounds being dissociated. Other elements are dealt by selection of an audiofrequency of 426⅔ c.p.s. for another generator, which is thereby effective to agglomerate released elements and compounds into solids that settle out. The output frequency of the third generator is selected at 469⅓ c.p.s. in order to deal with dissociation of hydrogen.

The audiofrequency generators 16 and 20 in accordance with the present invention may be of the fixed frequency, solid-state type while the audiofrequency generator 18 may be in the form of a magnetic tape playback device. Thus, by changing the audiofrequency signal recorded on the magnetic tape, the apparatus as illustrated in FIG. 1 may be tailored to treat specifically different waste materials such as peach effluent, wood pulps, iron wastes, etc. The present invention also contemplates the provision of several stages, each stage being composed of apparatus such as illustrated in FIG. 1 tailored to deal with special contaminants in the material to be treated which is passed sequentially through each stage. Thus, each stage will have different audiofrequency settings for the generators designed to deal with the different special contaminants.

Actual tests conducted on filtered sewage, reveals certain significant results obtained by means of the present invention. The following tabulation shows comparative test data on a filtered sewage having a predetermined mineral content:

COMPARATIVE TEST DATA ON FILTERED SEWAGE (a) Mineral content of untreated sewage:

| Ingredient: | Content (p.p.m.) |
|---|---|
| Potassium | 24 |
| Calcium | 38 |
| Magnesium | 19 |
| Sodium | 190 |
| Bicarbonates | 243 |
| Sulphates | 27 |
| Chlorides | 290 |
| Iron | 0.19 |
| Nitrogen compounds: | |
| Ammonia | 10.2 |
| Organic | 3.9 |
| Nitrates | 1.7 |
| Nitrites | 0.01 |

| (b) Comparative properties | Untreated sewage | Treated sewage Prior art | Treated sewage Waltrip | Units |
|---|---|---|---|---|
| Biochemical oxygen demand | 70 | 52 | 6 | P.p.m. |
| Suspended solids | 71 | 11 | 86 | P.p.m. |
| Volatile solids | 65 | 61 | | Percent. |
| Settable solids | 0.5 | | | Ml./liter. |
| pH | 7.7 | 9.4 | 9.8 | |
| Dissolved oxygen | 3.4 | 8.2 | 14.6 | P.p.m. |

From the foregoing tabulation, it will be observed that sewage treated in accordance with the present invention had a BOD of six parts per million (p.p.m.), indicating a significantly greater reduction from that of the untreated sewage as compared to the prior art. The reduction in BOD is of course a reflection of the successful treatment of sewage. It will however be also noted from the foregoing tabulation, that the content of suspended solids increased to 86 p.p.m. with respect to sewage treated in accordance with the present invention as compared to the expected reduction in the suspended solid content obtained in connection with prior art methods. Also, there was a significantly higher increase in dissolved oxygen in sewage treated in accordance with the present invention as compared to the sewage treated by prior art methods. This increase in suspended solids and dissolved oxygen may be explained by the dissociation phenomena theory underlying the present invention. Thus, the biochemical breakdown of organic matter and compounds results in the formation of solids and release of oxygen of beneficial import. This also explains why a larger part of the solids suspended in samples of sewage treated in accordance with the present invention, settled out after a short period of time, as actually observed.

The foregoing is considered as illustrative only of the principles of the invention. Further, since numerous modifications and changes will readily occur to those skilled in the art, it is not desired to limit the invention to the exact method, operation and apparatus shown and described, and accordingly all suitable modifications and equivalents may be resorted to, falling within the scope of the invention.

What is claimed as new is as follows:

1. A method of treating waste material including the steps of: generating oscillating energy at a predetermined resultant audiofrequency; combining said oscillating energy with complementing energy producing a predetermined beat frequency; transmitting said oscillating energy to the waste material; and ionizing the waste material to respond to said energy conducted thereto.

2. The method of claim 1 wherein said beat frequency is 256 cycles per second.

3. The method of claim 2 wherein said resultant audiofrequency is composed of frequencies of 256 and 469⅓ cycles per second, said complementing energy being generated at a frequency of 426⅔ cycles per second.

4. The method of claim 1 wherein said resultant audiofrequency is composed of frequencies of 256 and 469⅓ cycles per second, said complementing energy being generated at a frequency of 426⅔ cycles per second.

5. The method of claim 1 wherein said step of transmitting the oscillating energy to the waste material includes: modulating a radiofrequency carrier signal with said combined oscillating energy at the resultant audiofrequency; amplifying the modulated radiofrequency signal; and radiating said modulated signal into the waste material.

6. The method of claim 1 wherein said step of transmitting the oscillating energy to the waste material includes: amplifying the combined oscillating energy; converting the amplified energy into mechanical vibrations; conducting said vibrations to the ionized sewage; and simultaneously radiating a radiofrequency signal into the sewage.

7. A method of treating a medium composed of chemically combined components, including the steps of: generating oscillating energy at predetermined audiofrequencies; generating carrier energy having a fixed resultant beat frequency relationship to said audiofrequencies; transmitting the combined oscillating and carrier energy to the medium; and ionizing said components within the medium for dissociation in response to the transmitted energy.

8. The method of claim 7 wherein said beat frequency is in resonance with one of the components of the medium.

9. The method of claim 8 wherein said audiofrequencies are in resonance with other components of the medium.

10. The method of claim 9 wherein said medium is sewage and said components when chemically combined are contaminants.

11. The method of claim 7 wherein said medium is sewage and said components when chemically combined are contaminants.

12. Apparatus for treating waste material or the like comprising a plurality of audio signal generators, one of said generators having an output producing a resultant beat frequency of 256 cycles per second when combined with outputs from the other generators, amplifier means connected to said generators for amplifying the outputs thereof at the resultant frequency of said other of the generators, means for introducing the waste material into a treating chamber, and means connected to the amplifier means for transmitting the amplified output of the generators to the waste material within the treating chamber.

13. The combination of claim 12 including means for ionizing the waste material.

14. The combination of claim 13 wherein said transmitting means includes a screen disposed within the treating chamber, a plurality of parallel connected electrodes closely spaced from the screen and conductors connecting the screen and the electrodes to the amplifier means.

15. The combination of claim 14 including a radiofrequency oscillator connecting the generators to the amplifier means producing a carrier signal modulated by the outputs of said generator.

16. The combination of claim 12 wherein said transmitting means includes a screen disposed within the treating chamber, a plurality of parallel connected electrodes closely spaced from the screen and conductors connecting the screen and the electrodes to the amplifier means.

17. The combination of claim 12 including a radiofrequency oscillator connecting the generators to the amplifier means producing a carrier signal modulated by the outputs of said generator.

18. The combination of claim 12 wherein said transmitting means includes a transducer connected to the amplifier means and disposed within the treating chamber, and radiofrequency oscillating means supplying radiofrequency energy to the treating chamber.

19. A method of treating a fluent medium including the steps of: selecting chemically dissociating frequencies in resonance with undesirable components of the medium; conditioning the medium for reception of oscillating energy by ionizing said medium; and injecting the oscillating energy modulated at said frequencies into the conditioned medium.

20. The method of claim 19 wherein said dissociating frequencies include an audiofrequency causing dissociation of organic compounds to increase the content of suspended solids in the medium.

21. The method of claim 20 wherein the oscillating energy is modulated at a frequency causing the suspended solids to agglomerate into settable solids.

22. The method of claim 21 wherein said medium is a filtered effluent of sewage.

* * * * *